US012548418B2

(12) United States Patent
Grant et al.

(10) Patent No.: US 12,548,418 B2
(45) **Date of Patent: *Feb. 10, 2026**

(54) SENSOR POWERED BY ITEM OF MERCHANDISE FOR RETAIL SECURITY

(71) Applicant: InVue Security Products Inc., Charlotte, NC (US)

(72) Inventors: Jeffrey A. Grant, Charlotte, NC (US); Gary A. Taylor, Fort Mill, SC (US); Jonathon D. Phillips, Fort Mill, SC (US); David N. Berglund, Indian Trail, NC (US)

(73) Assignee: InVue Security Products Inc., Charlotte, NC (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/368,367

(22) Filed: Sep. 14, 2023

(65) Prior Publication Data

US 2024/0005753 A1 Jan. 4, 2024

Related U.S. Application Data

(63) Continuation of application No. 17/404,504, filed on Aug. 17, 2021, now Pat. No. 11,798,384, which is a continuation of application No. 16/031,684, filed on Jul. 10, 2018, now abandoned, which is a continuation of application No. 15/326,813, filed as application No. PCT/US2015/041451 on Jul. 22, 2015, now Pat. No. 10,062,250.

(Continued)

(51) Int. Cl.

| | |
|---|---|
| ***G08B 13/14*** | (2006.01) |
| ***E05B 73/00*** | (2006.01) |
| ***G08B 25/10*** | (2006.01) |

(52) U.S. Cl.

CPC .......... *G08B 13/14* (2013.01); *E05B 73/0082* (2013.01); *G08B 13/1418* (2013.01); *G08B 13/1445* (2013.01); *G08B 25/10* (2013.01)

(58) Field of Classification Search

CPC . E05B 73/0082; G08B 13/1418; G08B 13/14; G08B 25/10

USPC ....................................................... 340/572.1

See application file for complete search history.

(56) References Cited

U.S. PATENT DOCUMENTS

| | | | | |
|---|---|---|---|---|
| 6,992,585 | B2 | 1/2006 | Saleh et al. | |
| 7,446,659 | B2 * | 11/2008 | Marsilio ............ | G08B 13/1463 340/687 |

(Continued)

OTHER PUBLICATIONS

International Search Report and Written Opinion from corresponding International Application No. PCT/US2015/041451, dated Oct. 5, 2015 (7 pages).

*Primary Examiner* — Jack K Wang

(74) *Attorney, Agent, or Firm* — InVue Security Products Inc.

(57) ABSTRACT

Security systems and methods configured for use with an item of merchandise for retail display are provided. For example, a security system includes a sensor configured to be electrically connected to an internal power source of an item of merchandise and an alarm module configured to communicate with the sensor. The sensor is configured to receive power from the internal power source for performing one or more security functions, and the alarm module is configured to generate a security signal in response to a security event.

20 Claims, 9 Drawing Sheets

Related U.S. Application Data

(60) Provisional application No. 62/047,953, filed on Sep. 9, 2014, provisional application No. 62/028,541, filed on Jul. 24, 2014.

(56) References Cited

U.S. PATENT DOCUMENTS

| | | | | |
|---|---|---|---|---|
| 7,598,842 | B2 * | 10/2009 | Landram | H04L 67/303 340/5.1 |
| 7,656,292 | B2 | 2/2010 | Bartholf et al. | |
| 7,701,339 | B2 * | 4/2010 | Irmscher | G08B 13/2402 340/568.1 |
| 8,102,262 | B2 * | 1/2012 | Irmscher | G08B 13/149 340/568.1 |
| 8,217,791 | B2 | 7/2012 | Grimm | |
| 8,427,314 | B2 * | 4/2013 | Billiard | G08B 25/002 340/568.1 |
| 8,674,833 | B2 * | 3/2014 | Johnston | A47F 7/024 341/172 |
| 8,878,673 | B2 | 11/2014 | Grant et al. | |
| 9,194,532 | B2 | 11/2015 | Bisesti et al. | |
| 9,567,776 | B2 | 2/2017 | Moock et al. | |
| 10,062,250 | B2 | 8/2018 | Grant et al. | |
| 10,111,537 | B2 | 10/2018 | Johnston et al. | |
| 10,706,694 | B2 * | 7/2020 | Allison | G08B 13/1445 |
| 10,918,224 | B2 | 2/2021 | Johnston et al. | |
| 11,259,653 | B2 | 3/2022 | Johnston et al. | |
| 2005/0012613 | A1 * | 1/2005 | Eckstein | G06K 7/10079 340/8.1 |
| 2006/0097875 | A1 * | 5/2006 | Ott | G08B 13/1436 340/572.1 |
| 2007/0018843 | A1 | 1/2007 | Cullum | |
| 2008/0168806 | A1 | 7/2008 | Belden et al. | |
| 2008/0169923 | A1 | 7/2008 | Belden et al. | |
| 2008/0266089 | A1 | 10/2008 | Heran et al. | |
| 2009/0051535 | A1 | 2/2009 | Brenner | |
| 2009/0079566 | A1 | 3/2009 | Goldstein et al. | |
| 2009/0173868 | A1 * | 7/2009 | Fawcett | A47F 7/024 248/176.1 |
| 2011/0187531 | A1 | 8/2011 | Oehl et al. | |
| 2011/0303816 | A1 * | 12/2011 | Horvath | F16M 13/022 242/406 |
| 2012/0019383 | A1 * | 1/2012 | Fawcett | G08B 13/1463 340/568.1 |
| 2012/0099256 | A1 | 4/2012 | Fawcett et al. | |
| 2012/0293330 | A1 | 11/2012 | Grant et al. | |
| 2013/0063266 | A1 | 3/2013 | Yunker et al. | |
| 2013/0307692 | A1 | 11/2013 | Fawcett et al. | |
| 2014/0015674 | A1 | 1/2014 | Fawcett et al. | |
| 2014/0253290 | A1 * | 9/2014 | Yang | G06K 7/10188 340/10.1 |
| 2014/0351098 | A1 | 11/2014 | Shafer et al. | |
| 2015/0009034 | A1 | 1/2015 | Grant et al. | |
| 2015/0015192 | A1 | 1/2015 | Leabman et al. | |
| 2015/0091729 | A1 | 4/2015 | Phillips et al. | |
| 2015/0272694 | A1 | 10/2015 | Charles | |
| 2016/0078264 | A1 * | 3/2016 | Armstrong | G08B 13/2417 340/572.1 |
| 2016/0371944 | A1 | 12/2016 | Phillips et al. | |
| 2017/0206757 | A1 | 7/2017 | Grant et al. | |
| 2018/0315279 | A1 | 11/2018 | Grant et al. | |
| 2019/0059612 | A1 | 2/2019 | Johnston et al. | |
| 2019/0392690 | A1 * | 12/2019 | Helman | G08B 13/14 |
| 2022/0287478 | A1 | 9/2022 | Johnston et al. | |

* cited by examiner

SENSOR POWERED BY ITEM OF MERCHANDISE FOR RETAIL SECURITY

CROSS REFERENCE TO RELATED APPLICATIONS

This application is a continuation of U.S. application Ser. No. 17/404,504, which was filed Aug. 17, 2021, which is a continuation of U.S. application Ser. No. 16/031,684, filed on Jul. 10, 2018, which is a continuation of U.S. application Ser. No. 15/326,813, filed on Jan. 17, 2017, and now U.S. Pat. No. 10,062,250, which is a 371 National Stage entry of International Application No. PCT/US2015/041451, filed on Jul. 22, 2015, which claims the benefit to priority of U.S. Provisional Patent Application No. 62/028,541 filed on Jul. 24, 2014, and U.S. Provisional Patent Application No. 62/047,953 filed on Sep. 9, 2014, the entire disclosures of which are incorporated herein by reference.

FIELD OF THE INVENTION

Embodiments of the present invention relate to merchandise security, and, more particularly, to systems and methods for protecting retail display merchandise from theft.

BACKGROUND OF THE INVENTION

Displays for retail merchandise utilize different types of theft deterrent security systems and methods to discourage shoplifters. Many of these systems and methods include sensors and alarms that are mechanically attached, or are mechanically attached and electrically connected, to the item of merchandise to be protected. When the integrity of the display is compromised, such as by cutting or removing a cable that extends between the security system and the item of merchandise, or by separating the item of merchandise from the security system, an alarm is activated to alert store personnel of a potential theft situation. However, there are generally no known techniques to utilize the power from the item of merchandise and/or to track the location of the item of merchandise once the item is removed from the security system.

BRIEF SUMMARY OF THE INVENTION

Embodiments of the present invention are directed to security systems and methods for securing an item of merchandise from theft in a retail display. In one example, a security system for an item of merchandise having an internal power source is provided. The security system includes a sensor configured to be electrically connected to an internal power source of an item of merchandise and an alarm module configured to communicate with the sensor. The sensor is configured to receive power from the internal power source for performing one or more security functions, and the alarm module is configured to generate a security signal in response to a security event.

In another embodiment, a security system includes an item of merchandise comprising an internal power source and a sensor configured to be electrically connected to the internal power source. The security system further includes an alarm module configured to communicate with the sensor. The sensor is configured to receive power from the internal power source for performing one or more security functions, and the alarm module is configured to generate a security signal in response to a security event.

In a further embodiment, a method for securing an item of merchandise from theft is provided. The method includes connecting a sensor to an internal power source of an item of merchandise for receiving power from the internal power source to perform one or more security functions. The method also includes coupling an alarm module to the sensor, wherein the alarm module is configured to generate a security signal in response to a security event.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notations are used to indicate similar elements in alternative embodiments.

Figure 1:
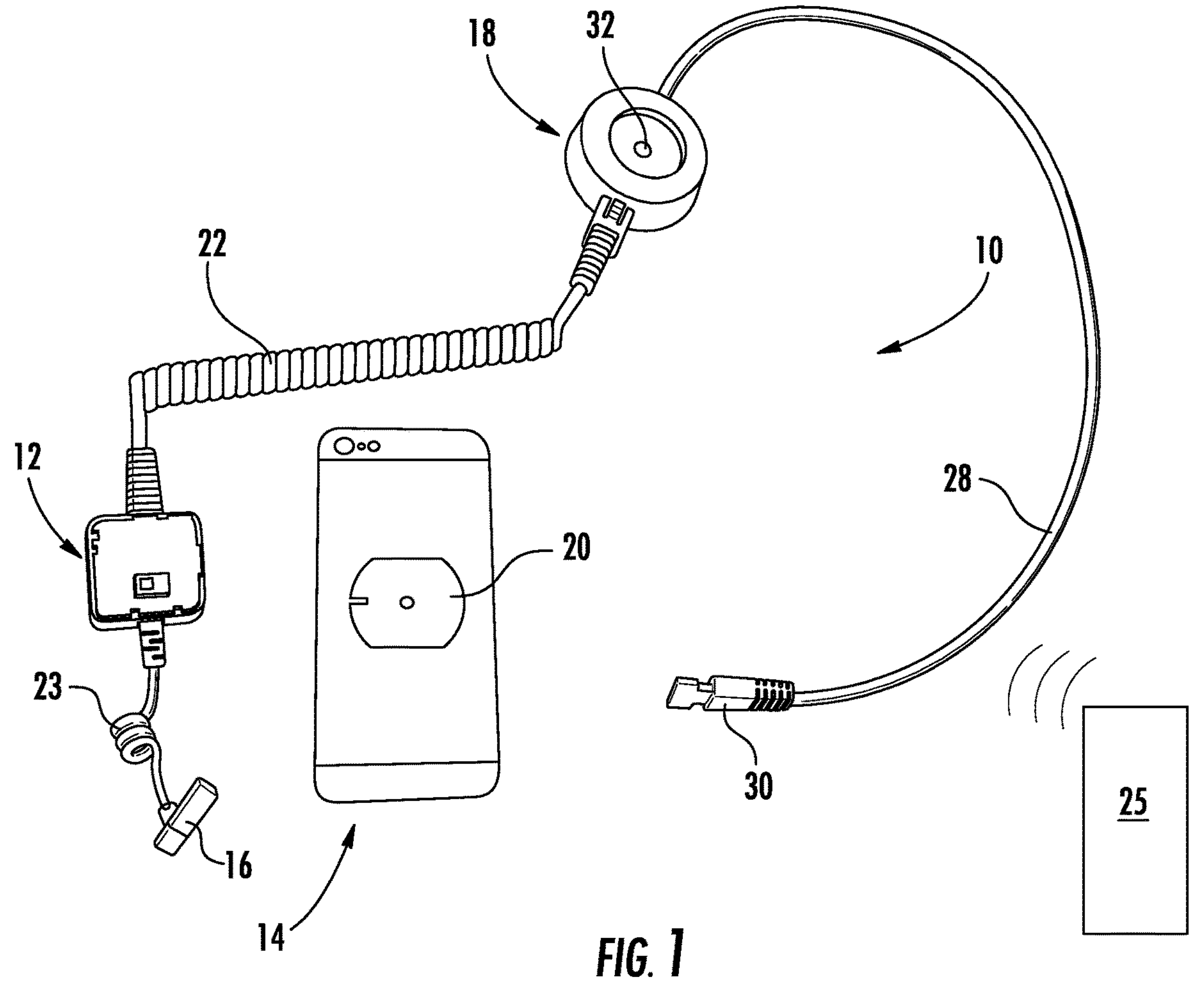
FIG. 1 is a perspective view of a security system according to one embodiment of the present invention.

FIG. 1 illustrates one embodiment of a security system 10 configured to secure an item of merchandise from theft in a retail display. The security system 10 may generally include a sensor 12 configured to be coupled to an item of merchandise 14 and an alarm module 18 in electrical communication with the sensor. As explained in further detail below, the sensor 12 may be configured to utilize power from the item of merchandise 14 and/or to communicate its location for tracking the item of merchandise. The alarm module 18 may be configured to generate a security signal in response to various security events, as also explained below.

The item of merchandise 14 may be any electronic device, such as a mobile or cellular phone, smartphone, a tablet, laptop computer, or the like. Furthermore, although the security system 10 is discussed in conjunction with a retail display or retail store, it is understood that the security system is applicable to any number of environments, such as in hospitals, restaurants, etc. where an item is desired to be protected from theft or unauthorized removal.

The sensor 12 may be removably engaged with the item of merchandise 14, such as by being connected to an input port of the item of merchandise. As shown in FIG. 1, the sensor 12 may include a connector 16 at the end of a cable 23 for engaging an input port of the item of merchandise. The input port could be a standard input port on the item of merchandise, such as a USB, micro-USB, or the like. The input port may be the same port used for power and/or data transfer with the item of merchandise 14. The cable 23 could be a flexible and/or extendable cable in some cases, or could be rigid in other instances. Thus, use of the term "cable" is not intended to be limiting, as the cable could be any cable, cord, coupling, member, or the like, as well as any desired size or configuration, that is configured to electrically connect the sensor 12 and the item of merchandise 14 and/or the alarm module 18 and the item of merchandise. For example, the cable 23 could be rigid and include a connector 16 that is not easily removable from the item of merchandise without first removing the sensor 12 from the item of merchandise, or disconnecting the cable from the sensor in an authorized manner (e.g., with a key or a tool). Such a rigid cable could be useful for items of merchandise 14 that do not provide for a removable battery cover or door. The cable 23 may include one or more conductors for electrically connecting the item of merchandise 14 to the sensor 12.

Figure 2:
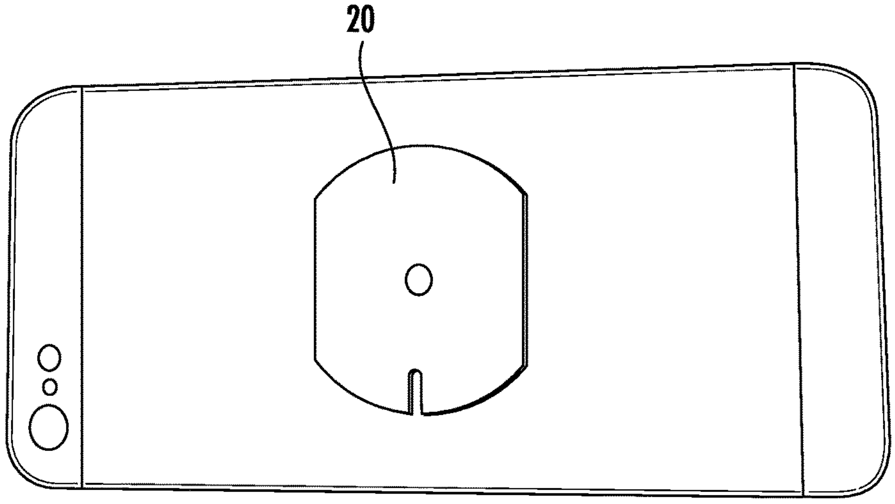
FIG. 2 is a plan view of an item of merchandise and a clip secured thereto according to an embodiment of the present invention.

The sensor 12 may also be attached to the item of merchandise 14 with adhesives, fasteners, and the like. For example, FIG. 2 shows that a clip, an adapter, a "shoe", or the like 20 may be attached to a rear surface of the item of merchandise 14 (e.g., with a pressure-sensitive adhesive). The sensor 12 and the clip 20 may be configured to engage with one another for securing the sensor to the item of merchandise 14. In one example, the sensor 12 and the clip 20 may be configured to rotatably engage with one another such that rotation of the sensor in one direction engages the clip and rotation in an opposite direction disengages the clip. The sensor 12 and clip 20 may be attached in a "snap-fit" connection, and the connection may be "quick-release" to allow for ready removal of the sensor by an authorized person (e.g., for remerchandising or daily removal).

In some embodiments, the sensor 12 and the item of merchandise 14 are in electrical communication with one another when the sensor is engaged therewith. In other embodiments, the sensor 12 may include a proximity mechanism (see, e.g., a pressure or plunger switch 27 shown in FIGS. 11-12) that is configured to detect when the sensor is removed from the item of merchandise 14. The sensor 12 may include sensor electronics for detecting various security events and/or communicating with the alarm module 18 and/or a monitoring system 25. The sensor 12 may include a device (e.g., an EAS tag) that is configured to be detected by an appropriate detector (e.g., an EAS tower or gate) which results in the generation of a security signal upon detection of the device.

The sensor 12 may include communications circuitry for communicating with a monitoring system 25. For example, the communications circuitry may be configured to wirelessly communicate with the monitoring system 25 using any desired communications protocol such as, for example, Global System for Mobile Communications (GSM), Bluetooth communication, Bluetooth low energy communication, radiofrequency (RF), WiFi, cellular, received signal strength indicator ("RSSI"), and/or ambient backscatter. Similarly, the monitoring system 25 may include complementary communications circuitry for communicating with the sensor 12. The wireless communications circuitry carried by the sensor 12 and/or monitoring system 25 may include, for example, one or more wireless transceivers for transmitting and receiving wireless communications. The sensor 12 may also include an antenna for sending and/or receiving various wireless signals.

The monitoring system 25 may be configured to communicate wirelessly with the sensor 12 and/or the item of merchandise 14. In some embodiments, the sensor 12 and the monitoring system 25 may be configured to communicate with one another to determine a location of the item of merchandise 14. Thus, the sensor 12 and the monitoring system 25 may cooperate to determine a location of an item of merchandise 14, which may be used to locate an item of merchandise that has experienced a security event. It is understood that the monitoring system 25 may be any system configured to communicate with the sensor 12 and to take any appropriate action. For example, the monitoring system 25 may be operated by a third party and have authorization to communicate any security events to the relevant authorities. In one example, the monitoring system 25 may notify a local police department of an ongoing theft so that the police may monitor the location of the item of merchandise 14 and may choose to go to the last reported location to take appropriate action. In some cases, the monitoring system 25 may be authorized to take remedial action directly. It is understood that the monitoring system may be located remotely from the security system. The monitoring system 25 may utilize software or web-based applications to view and/or track the location of the sensor 12.

In one embodiment, the sensor 12 is configured to receive power from the item of merchandise 14. For example, the item of merchandise 14 may include an internal power source (e.g., a battery) that is configured to transfer power to the sensor 12 when the sensor is operably engaged therewith. As such, the sensor 12 does not require its own power source for operation, although a power source could be provided if desired. The sensor 12 could include a power source that is utilized only when a security event occurs such that no standby power is required and the size of the power source is minimized. In one embodiment, the alarm module 18 is electrically connected to the sensor 12 and an external power source. For example with reference to FIG. 1, the alarm module 18 may include a cable 28 including one or more conductors for transmitting power to the alarm module, the sensor 12, and/or the item of merchandise 14. The sensor 12 may be electrically connected to the alarm module 18 with a cable 22. The cable 22 may include one or more electrical conductors for transmitting power, data, state (e.g., short or resistor value), and/or security signals between the sensor 12 and the alarm module 18. In one embodiment, the alarm module 18 includes a connector 30 that is configured to directly or indirectly couple to a power source, such as a computing device (e.g., a PC or portable computer), a power outlet, or a wall power adapter. As a result, the alarm module 18 is configured to both mechanically and electrically connects the sensor 12 to a power source. However, it is understood that the sensor 12 and the alarm module 18 may be connected to the alarm module 18 via wireless communication such that cable 22 is not required in some embodiments. In this case, various other techniques could be employed for transferring power to the sensor 12 and the item of merchandise 14, such as contact or inductive charging.

Figure 11:
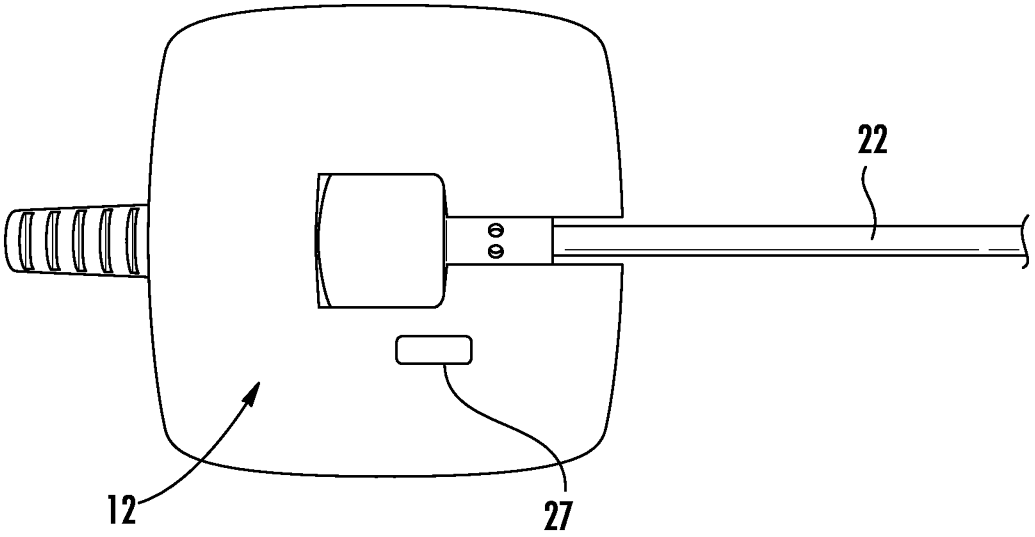
FIG. 11 is a plan view of an end of a cable removably secured to a sensor according to another embodiment of the present invention.
Figure 12:
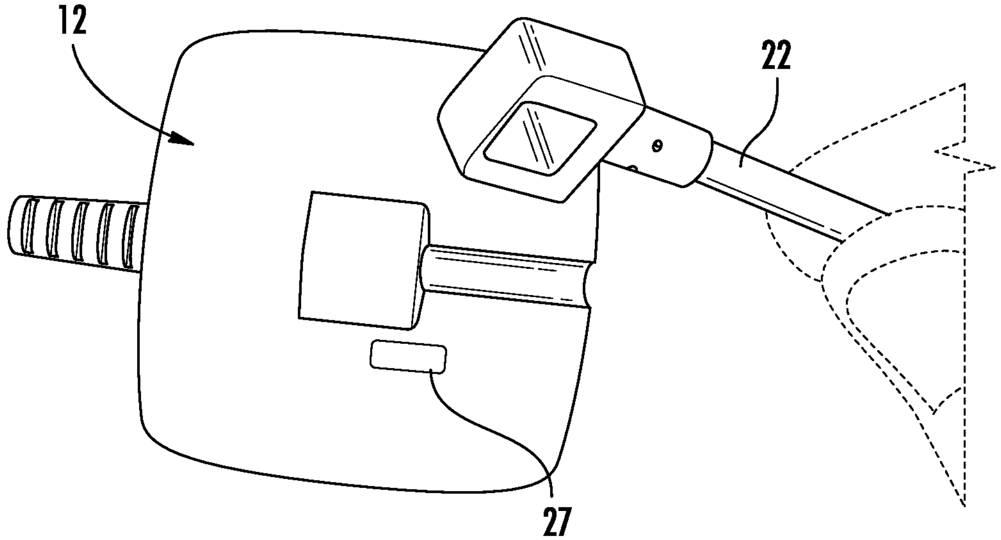
FIG. 12 is a perspective view of the end of the cable shown in FIG. 11 removed from the sensor.
Figure 13:
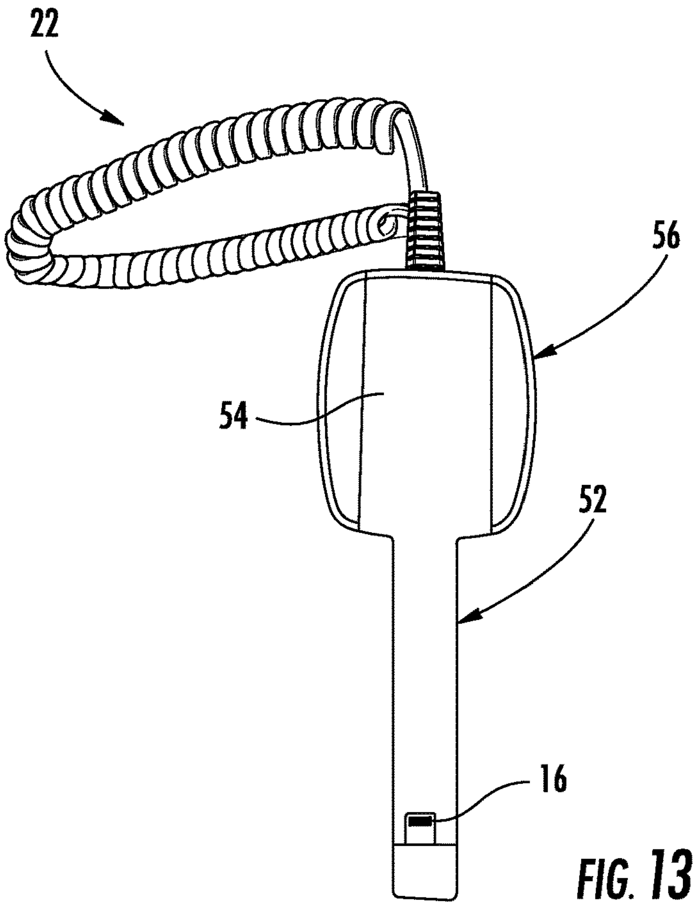
FIG. 13 is a plan view of a sensor and a clip removably secured thereto according to another embodiment of the present invention.
Figure 14:
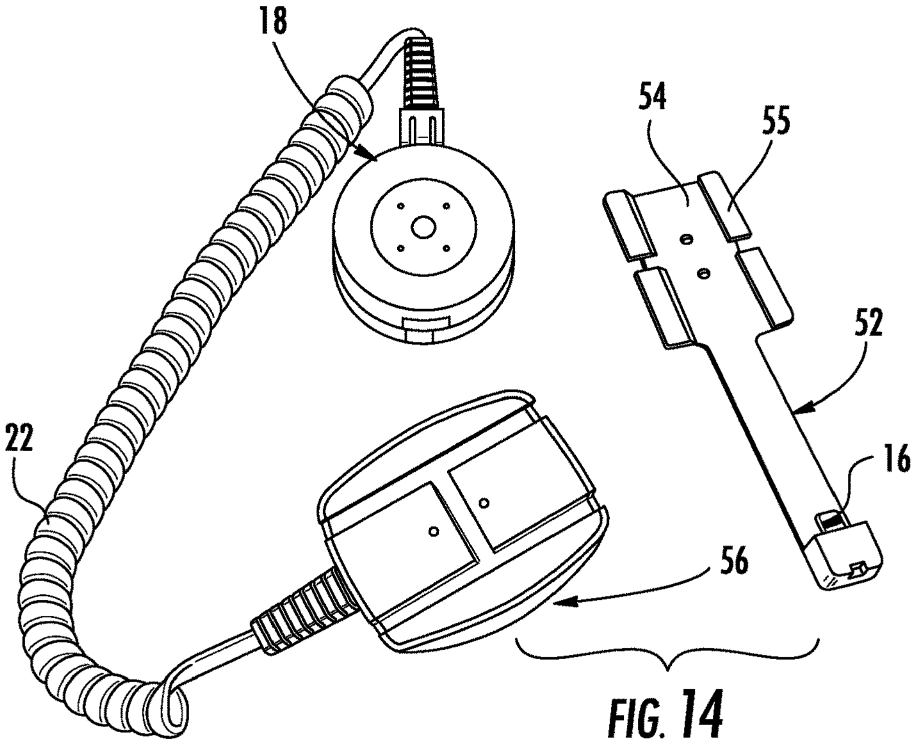
FIG. 14 is a perspective view of the clip removed from the sensor shown in FIG. 13.
Figure 15:
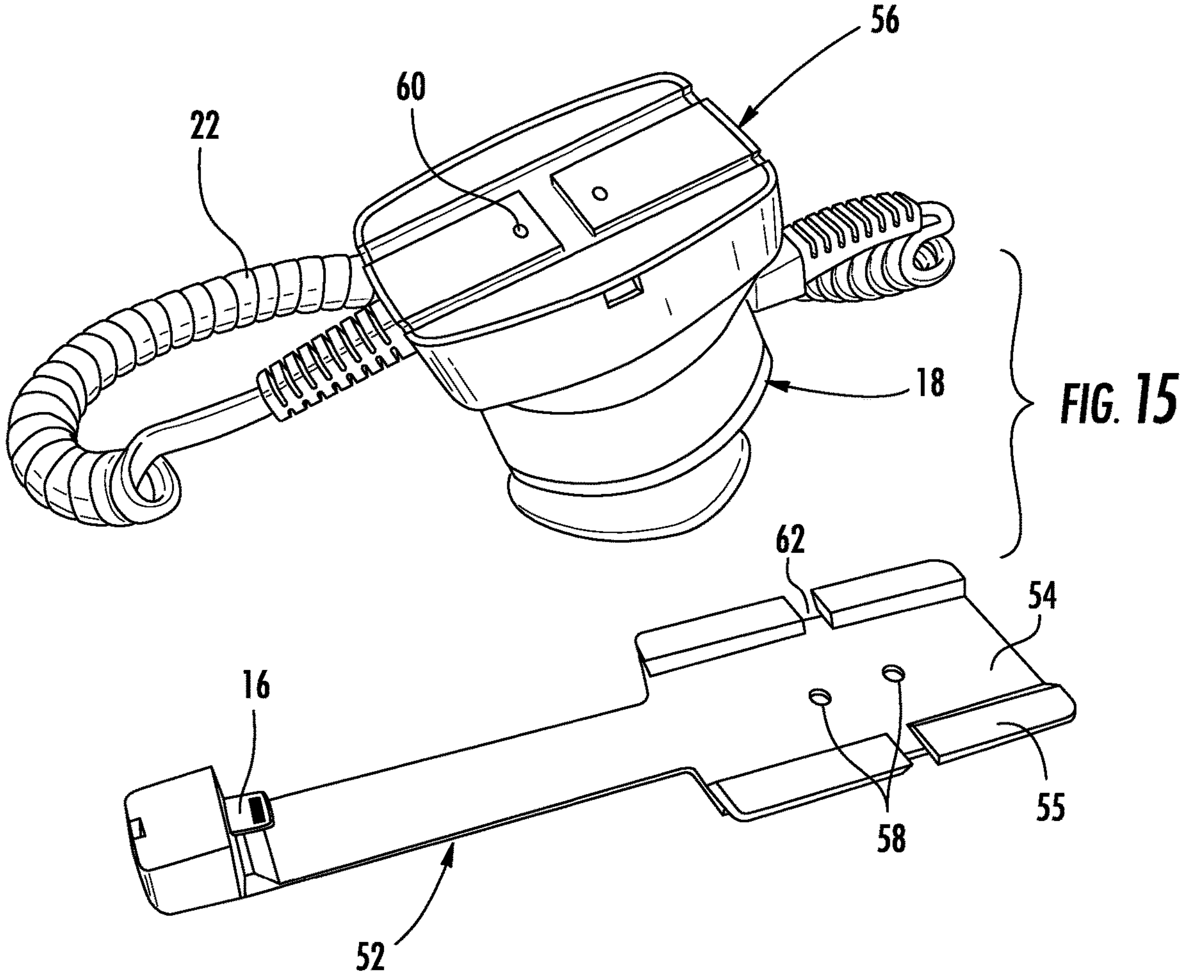
FIG. 15 is another perspective view of the clip removed from the sensor shown in FIG. 13.
Figure 16:
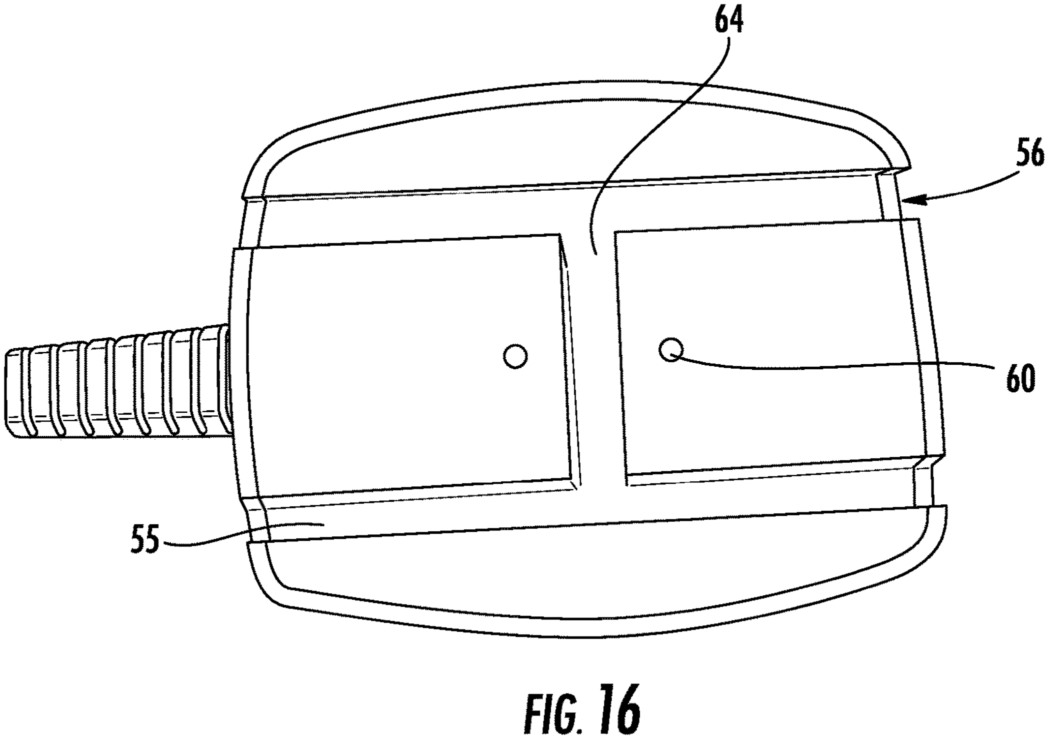
FIG. 16 is an enlarged plan view of the sensor shown in FIG. 13.
Figure 17:
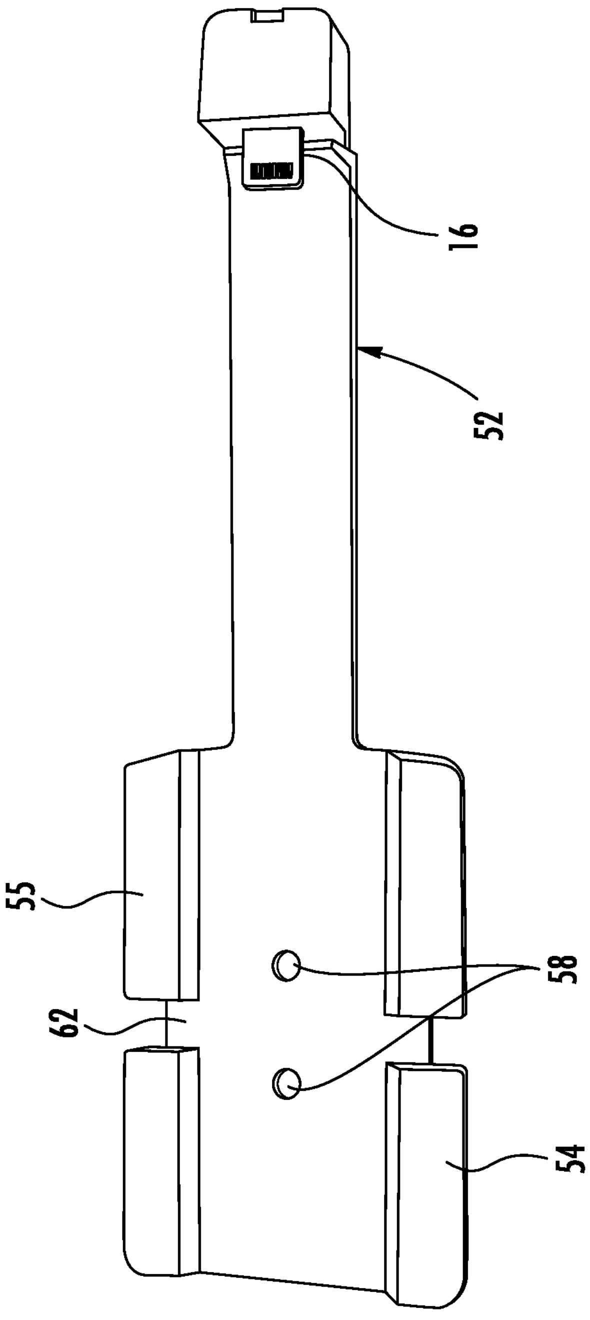
FIG. 17 is an enlarged plan view of the clip shown in FIG. 13.

The alarm module 18 may be operably engaged with the cables 22, 28 in a variety of manners. For example, the alarm module 18 may be hardwired to the cables 22, 28 at each end and include conductors configured to cooperate with conductors in the cables. Alternatively, each cable 22, 28 may plug into the alarm module 18. In another embodiment, either of the cables 22, 28 may be continuous and extend through the alarm module and be configured to communicate with the alarm module. In one example, FIGS. 11-12 show that the end of the cable 22 may be removably secured to the sensor 12. When an end of the cable 22 is inserted within the sensor body, the cable and sensor 12 are electrically connected to one another. Thus, the end of the cable 22 may include a suitable connector for electrically connecting to the sensor 12. In addition, when the end of the cable 22 is inserted, the sensor 12 may be attached to the item of merchandise 14 such that the end of the cable cannot be removed without first removing the sensor. Because the cable 22 is removable, the sensor 12 may be readily replaced should the cable be cut or otherwise damaged. It is understood that a similar connection make take place between the sensor 12 and the cable 23. In some embodiments, the alarm module 18 may be configured to receive and removably support the sensor 12 and the item of merchandise 14 thereon in a display position. For example, the sensor 12 and the alarm module 18 may include cooperating magnets or geometry that facilitates mating engagement with one another.

The alarm module 18 may include an alarm that will generate a security signal, such as an audible and/or visual alarm. The alarm module 18 may include an alarm for generating a security signal in response to various security events (e.g., unplugging/cutting cables 22, 23, detaching or disconnecting the sensor 12, etc.). For example, the alarm module 18 may include a piezoelectric alarm to generate an audible signal, as well as circuitry for detecting a security event. The alarm module 18 could also be configured to generate a visible alarm or provide other visible indicators (e.g., armed or alarming), such as with an LED. It is understood that the sensor 12 may also include a similar alarm, or the alarm module 18 may be integrated with the sensor or otherwise contained within the same housing as the sensor. The alarm module 18 may be further configured to detect a connection between the sensor 12 and/or power source. The alarm module 18 may further include an internal power source configured to provide power to the alarm module in the event that power from an external power source is interrupted or lost. In one embodiment, the internal power source is a rechargeable battery that is recharged by power supplied by the remote power source.

In some embodiments, the alarm module 18 can be armed, disarmed, and/or silenced with a security key, which may utilize mechanical, wireless, and/or electrical communication between the alarm module and the security key. For example, the security key may be configured to wirelessly communicate a security code to the alarm module 18, such as by infrared, optical, acoustic, or inductive communication. The alarm module 18 may include a port 32, window, or the like configured to receive wireless signals from the security key. In one particular embodiment, the security key is similar to that disclosed in U.S. Pat. No. 7,737,845, entitled Programmable Key for a Security System for Protecting Merchandise, which is incorporated by reference herein in its entirety. In additional embodiments, the alarm module may include near field communication (NFC) functionality and be configured to communicate with a security key or device having NFC functionality for arming and disarming the alarm unit. Alternatively, the alarm module 18 may include "screen swipe" functionality and/or be configured to sense particular movement or motion of the alarm module to arm or disarm the alarm module. Likewise, the alarm module 18 may include biometric functionality for recognizing a particular user to arm or disarm the alarm unit.

As noted above, the sensor 12 may be configured to utilize power from the item of merchandise 14 for performing one or more functions according to some embodiments. Thus, the sensor 12 may not require a power source for performing various security functions. In one example, the sensor 12 may be configured to transmit power from a power source to the item of merchandise 14, such as via cable 23 and connector 16. For instance, the sensor 12 may simply pass power through to the item of merchandise 14 for charging the battery of the item of merchandise. In addition, the sensor 12 may be configured to receive power from the battery of the item of merchandise 14. The sensor 12 may utilize the power provided from the battery to perform one or more security functions (e.g., communicating with the monitoring system 25 and/or generating a security signal). In another example, the item of merchandise 14 may utilize USB "on-the-go" or like functionality for facilitating power transfer from the item of merchandise to the sensor 12. Thus, unlike conventional sensors that utilize its own power source or another external power source other than an item of merchandise, the sensor 12 may be configured to utilize power from the item of merchandise 14. Therefore, the size of the sensor 12 may be kept minimal since there is no need to include a separate power source. Other examples of utilizing the power source from an item of merchandise are disclosed in U.S. Provisional Application No. 61/935,487, filed on Feb. 4, 2014 and entitled Systems and Methods for Protecting Retail Display Merchandise from Theft, which is incorporated by reference herein in its entirety.

In one embodiment, the sensor 12 may be configured to determine its location for asset tracking. Thus, should the item of merchandise 14 and sensor 12 be removed from the security system in an unauthorized manner, the sensor may determine the location thereof and communicate the location to the monitoring system 25. The monitoring system 25 may then determine whether to contact the relevant authorities to take appropriate remedial action. The sensor 12 may be configured to only receive power from the item of merchandise 14 upon detecting motion thereof. In some embodiments, the communication between the monitoring system 25 and the sensor 12 may be initiated when a consumer interacts with the item of merchandise. For example, communication may begin when a consumer picks up the item of merchandise 14. The monitoring system 25 may detect when the sensor 12 and/or the item of merchandise 14 begins moving. Upon the item of merchandise 14 being picked up, the sensor 12 may be configured to detect this interaction and thereafter establish a location thereof. The sensor 12 may alternatively be configured to begin tracking location when motion is detected for a predetermined period of time. The sensor 12 may also be configured to communicate other types of data in addition to location information, such as an identifier of the item of merchandise 14 (e.g., serial number).

Once motion has been detected and the sensor 12 is receiving power from the item of merchandise 14, the sensor may be configured to transmit its location to the monitoring system 25. The sensor 12 may communicate its location in predetermined time increments, such as every 1-5 seconds, every 5-20 seconds, every 20 seconds to 1 minute, etc. The time increment may depend on when the security event occurred. For instance, a shorter time increment may be appropriate shortly after the security event occurs (e.g., within 20-30 minutes of the security event), while a longer time increment may be appropriate after a longer period of time following the security event (e.g., 1-2 hours).

In one embodiment, the sensor 12 may utilize GSM, GPS, and/or triangulation tracking functionality to determine its position, although as discussed above, the sensor may include various wireless communications functionality that may be used to determine the location of the sensor. The sensor 12 may be configured to determine its location independently or may communicate with the monitoring system 25 for determining the location of the sensor. In other embodiments, the sensor 12 may be configured to determine its location using its own positioning functionality to determine the location of the item of merchandise 14. Thus, the sensor 12 may utilize various components carried thereby to determine the location of the item of merchandise 14. According to one embodiment, trusted positioning may be implemented using similar techniques as that described in U.S. Patent Publication No. 2012/0293330, entitled Systems and Methods for Protecting Retail Display Merchandise From Theft, the contents of which is incorporated by reference herein in its entirety.

Figure 3:
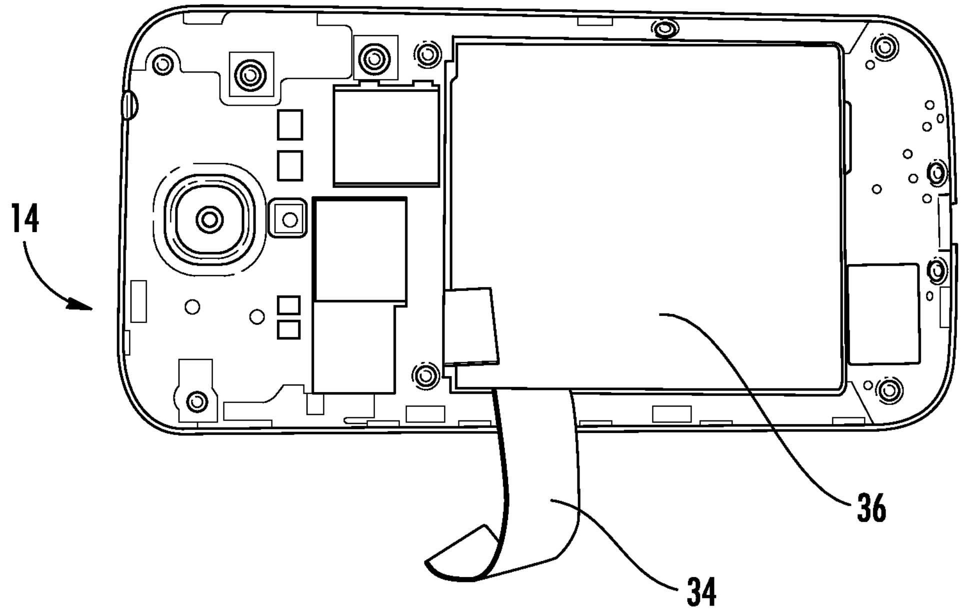
FIG. 3 is a plan view of flexible circuit secured to a power source of an item of merchandise according to an embodiment of the present invention.
Figure 4:
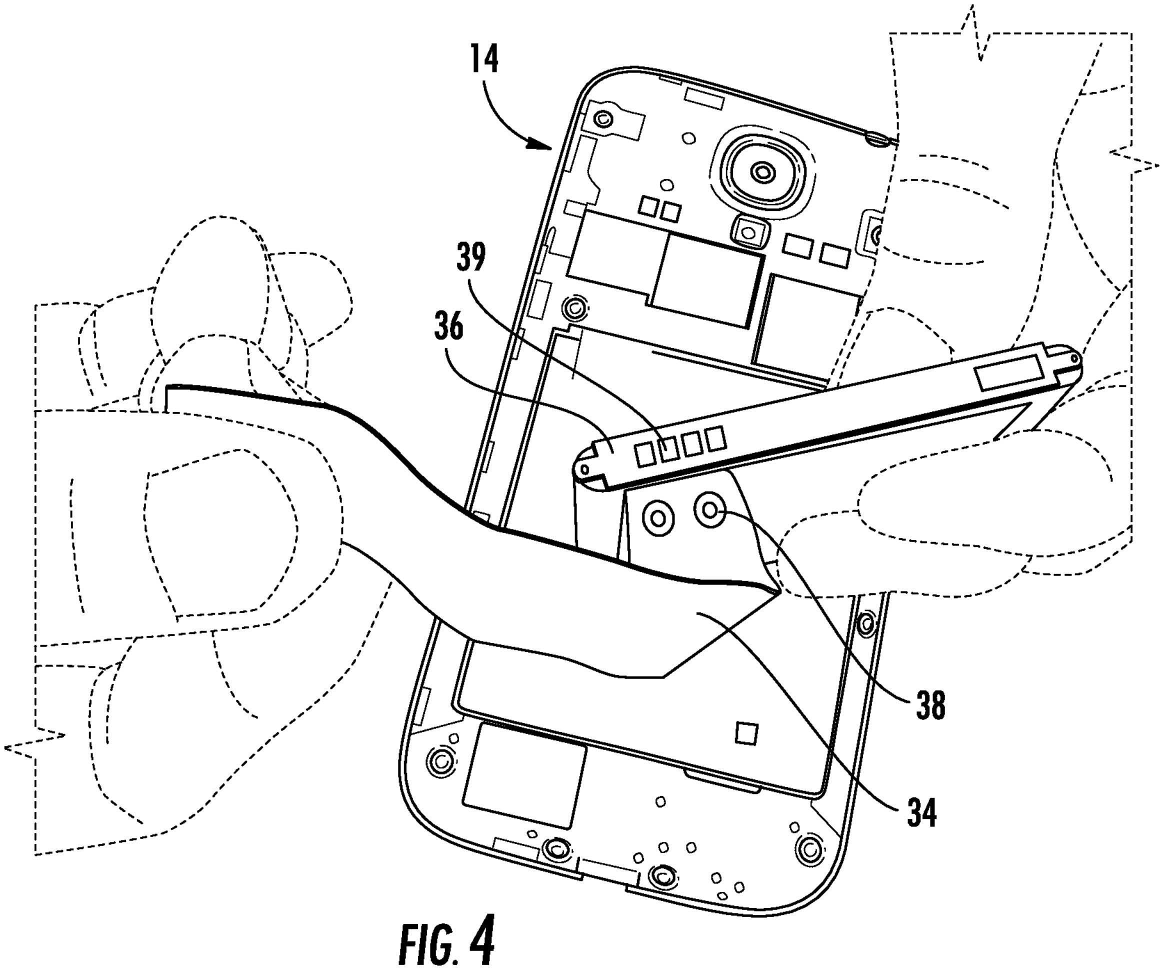
FIG. 4 is a perspective view of the flexible circuit secured to the power source shown in FIG. 3.

In some embodiments, the sensor 12 includes a flexible circuit 34 for establishing an electrical connection with the internal power source or battery 36 of the item of merchandise (see, e.g., FIGS. 3-4). For instance, the flexible circuit 34 may include one or more conductors 38 that are configured to electrically connect to the battery 36 and the sensor 12. According to one embodiment, the flexible circuit is similar to that disclosed in U.S. Provisional Application No. 61/897,538, filed on Oct. 30, 2013 and entitled Sensor with a Flexible Circuit for a Portable Electronic Device, U.S. Provisional Application No. 61/930,589, filed on Jan. 23, 2014 and entitled Flexible Camera Lens Sensor, and U.S. Provisional Application No. 61/989,647, filed on May 7, 2014 and entitled Sensor with a Flexible Circuit for a Portable Electronic Device, the contents of which are incorporated by reference herein in their entirety.

As noted above, the flexible circuit 34 may comprise one or more conductors 38 that electrically interconnect the internal power source 36 of the item of merchandise 14 with the sensor 12. Where the internal power 36 source is a battery, the conductors 38 may be attached directly to the terminals 39 of the battery (see, e.g., FIGS. 3-4). For example, the conductors 38 may be attached directly to the battery terminals 39. The conductors 38 of the flexible circuit may be arranged on the internal power source 36 such that the conductors are in electrical communication with the internal power source and the electronics of the sensor. Thus, the conductors 38 may be disposed between the internal power source 36 and the sensor electronics without hindering the operation of the item of merchandise 14. For instance, the conductors 38 of the flexible circuit may be sandwiched between the terminals 39 of the battery and conductive pins disposed within the item of merchandise 14 such that the conductors electrically connect to the conductive pins when the battery is inserted within the item of merchandise. Likewise, the conductors 38 of the flexible circuit may be attached directly to the sensor electronics to establish electrical communication between the sensor 12 and the internal power source 36. For example, the conductors 38 of the flexible circuit may be hardwired to the sensor electronics. Thus, the conductors 38 may be configured to extend at least partially along a length of the flexible circuit 34. In addition, the flexible circuit 34 may be configured to extend through an opening defined in the sensor 12 and conform to the sensor and item of merchandise 14 so as to be generally unnoticeable by a customer. In some embodiments, the flexible circuit 34 may be attached directly to the internal power source 36, such as with a releasable adhesive. Thus, the flexible circuit 34 may be removably attached to an internal power source 36, including an original equipment manufacturer (OEM) battery, without the need for hardwiring or other mechanical attachment.

Figure 5:
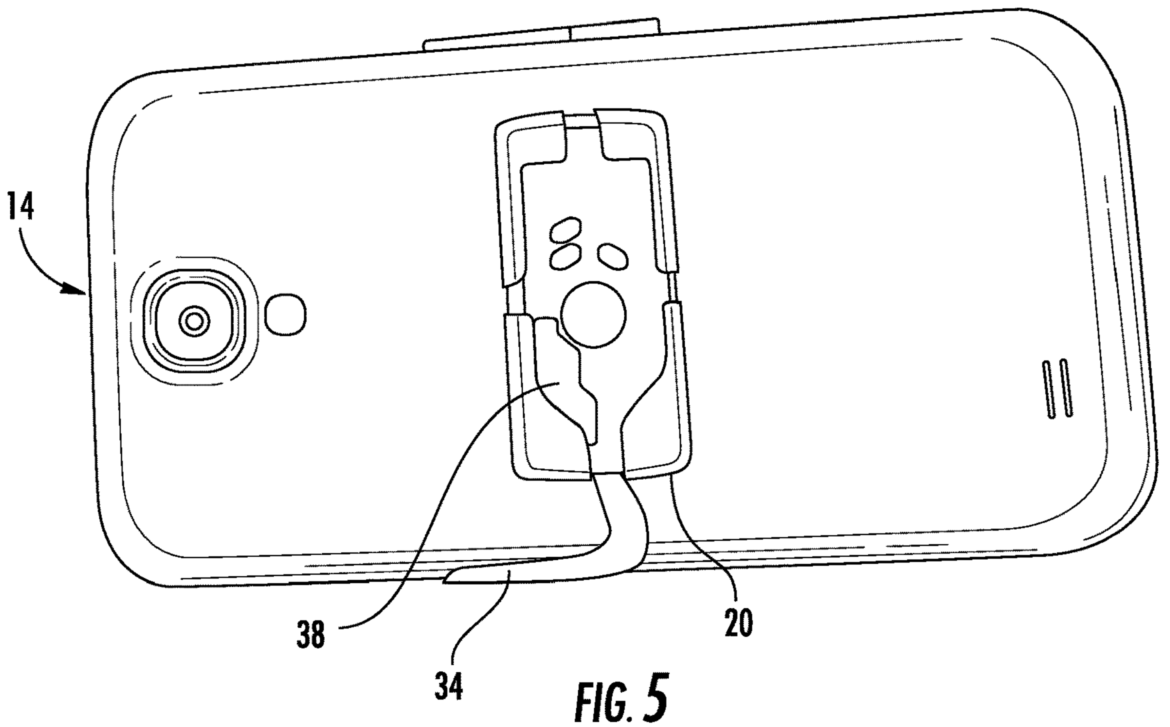
FIG. 5 is a plan view of a clip secured to an item of merchandise and a flexible circuit received by the clip according to an embodiment of the present invention.
Figure 6:
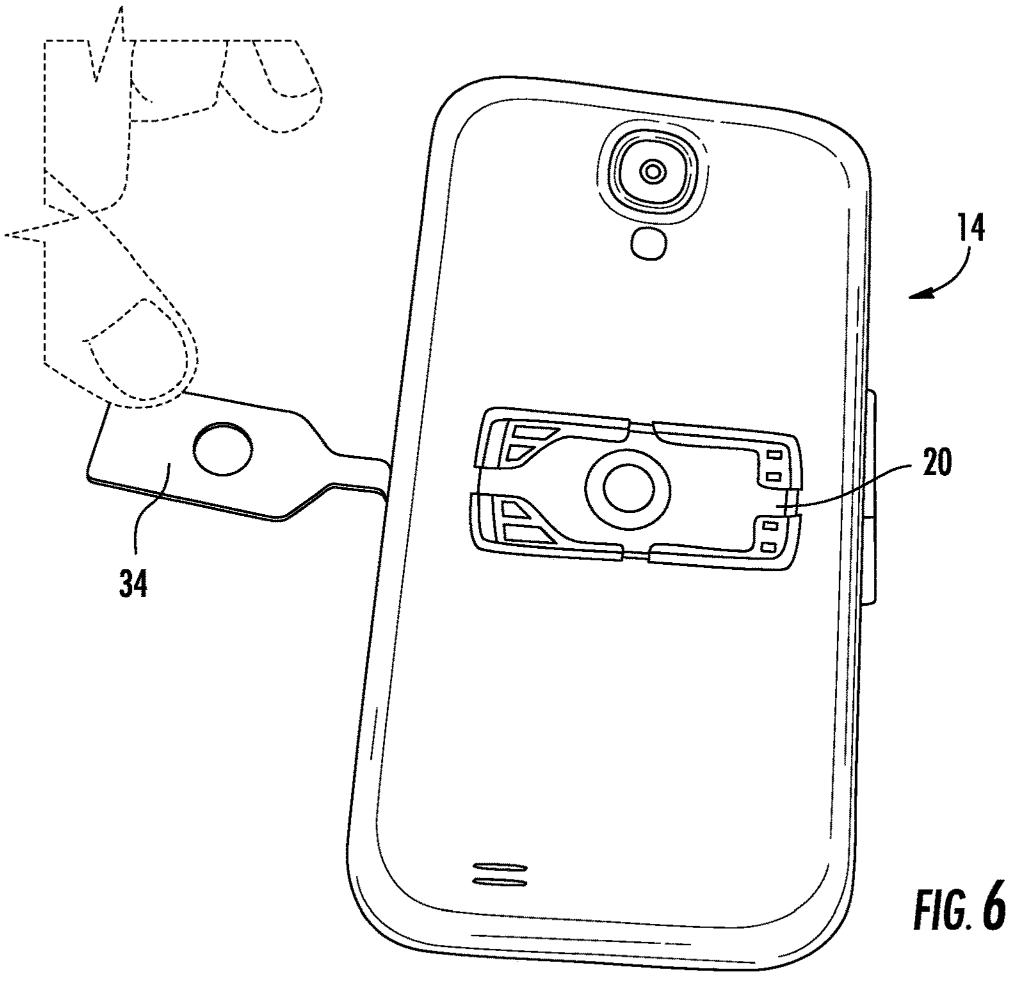
FIG. 6 is another plan view of the clip shown in FIG. 5 with the flexible circuit removed from the clip.
Figure 7:
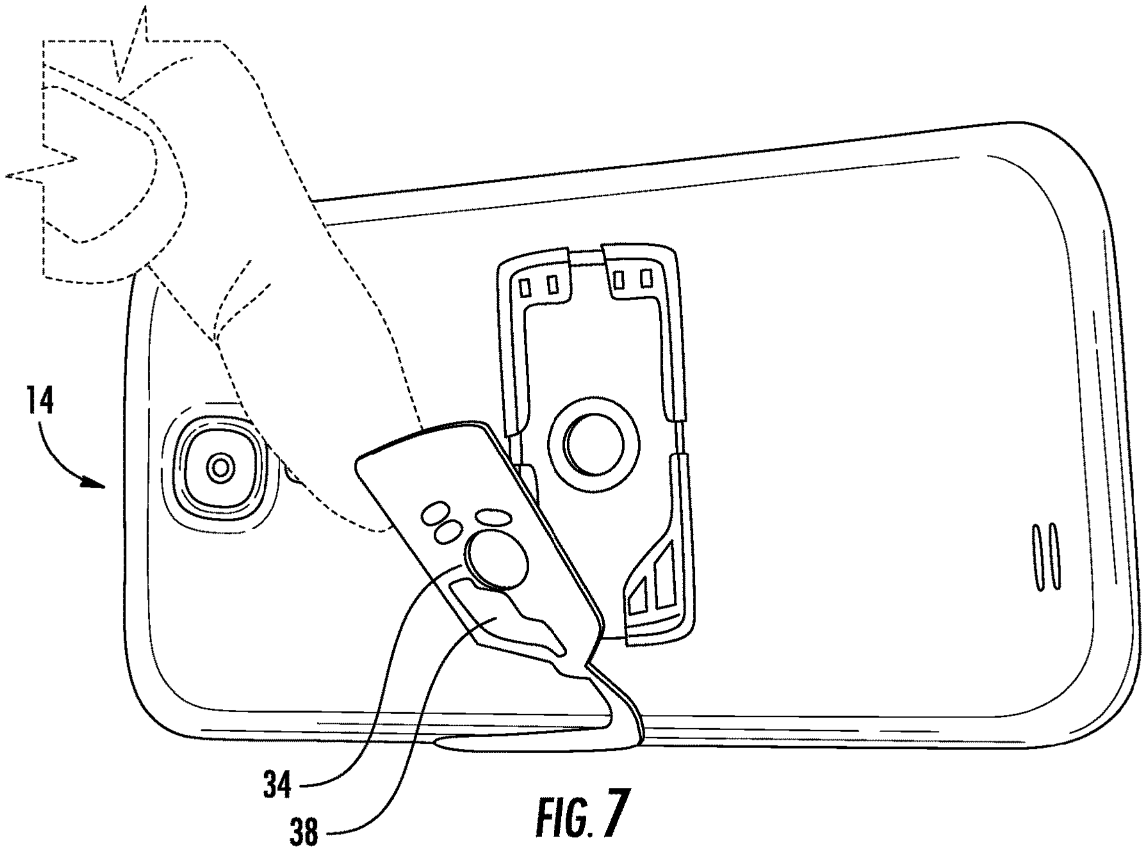
FIG. 7 is a perspective view of the clip shown in FIG. 5 with the flexible circuit removed from the clip.
Figure 8:
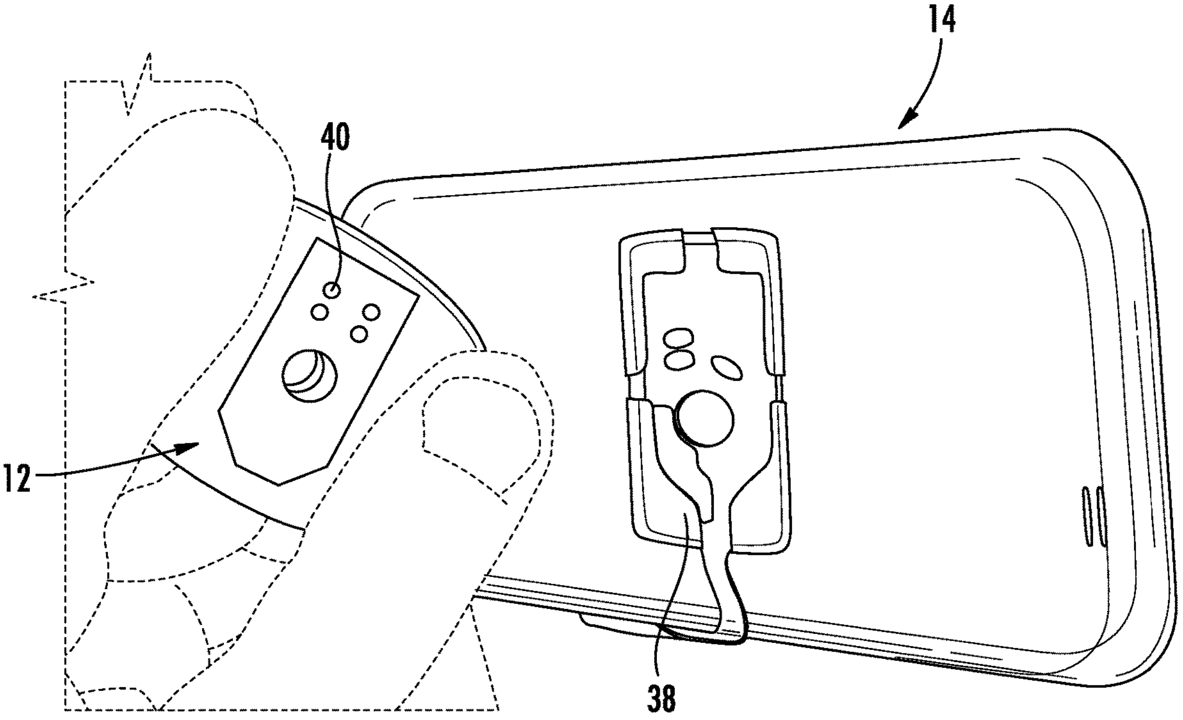
FIG. 8 is a perspective view of the clip and the flexible circuit shown in FIG. 5 prior to securing a sensor to the clip.

In another embodiment shown in FIGS. 5-8, the flexible circuit 34 may be removable from the sensor 12. For example, FIG. 6 shows that the clip 20 may be configured to receive a portion of the flexible circuit 34 for establishing electrical communication with the sensor 12. When positioned within the clip 20, the conductors 38 of the flexible circuit 34 are facing outwardly as shown in FIG. 5. The sensor 12 may include one or more conductors 40 that are configured to align with and engage the conductors 38 when the sensor is attached to the clip 20. Thus, an electrical connection is established when the sensor 12 is attached to the clip 20 and the conductors 38, 40 engage one another. The conductors 40 may be "pogo" pins that are configured to extend and retract relative to the sensor 12 (see, e.g., FIG. 8), which may facilitate an electrical connection with the flexible circuit 34 when secured thereto.

According to one embodiment, the flexible circuit 34 has a suitable length that allows the flexible circuit to extend within an internal compartment of the item of merchandise 14, such as a battery compartment, and allow a cover or movable door to close when the flexible circuit is extending within the compartment (see, e.g., FIGS. 5-8). Thus, the flexible circuit 34 does not inhibit use of the battery compartment of the item of merchandise 14. Flexible circuit 34 is also flexible so as to be bendable for extending from the internal power source 36 to the sensor 12. In some embodiments, the flexible circuit 34 is ribbon-like and bendable without deforming the flexible circuit. As such, the flexible circuit 34 is thin and flexible so as to not hinder closing of the battery compartment cover or door.

Figure 9:
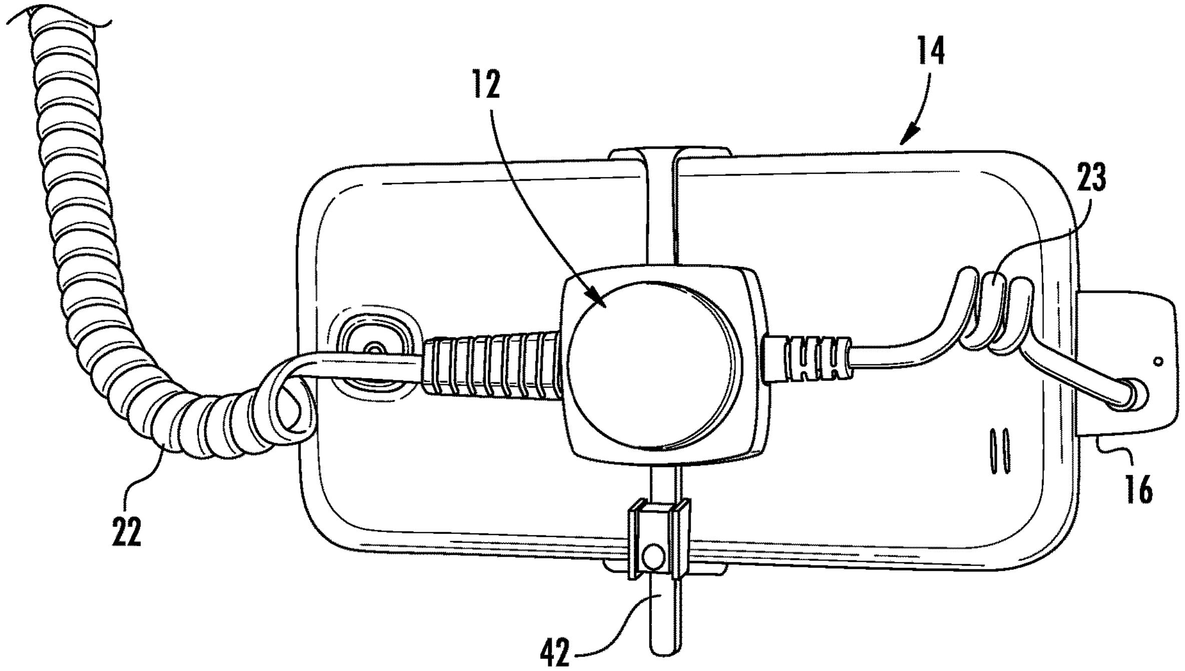
FIG. 9 is a plan view of a security system including a sensor having one or more bracket arms according to an embodiment of the present invention.
Figure 10:
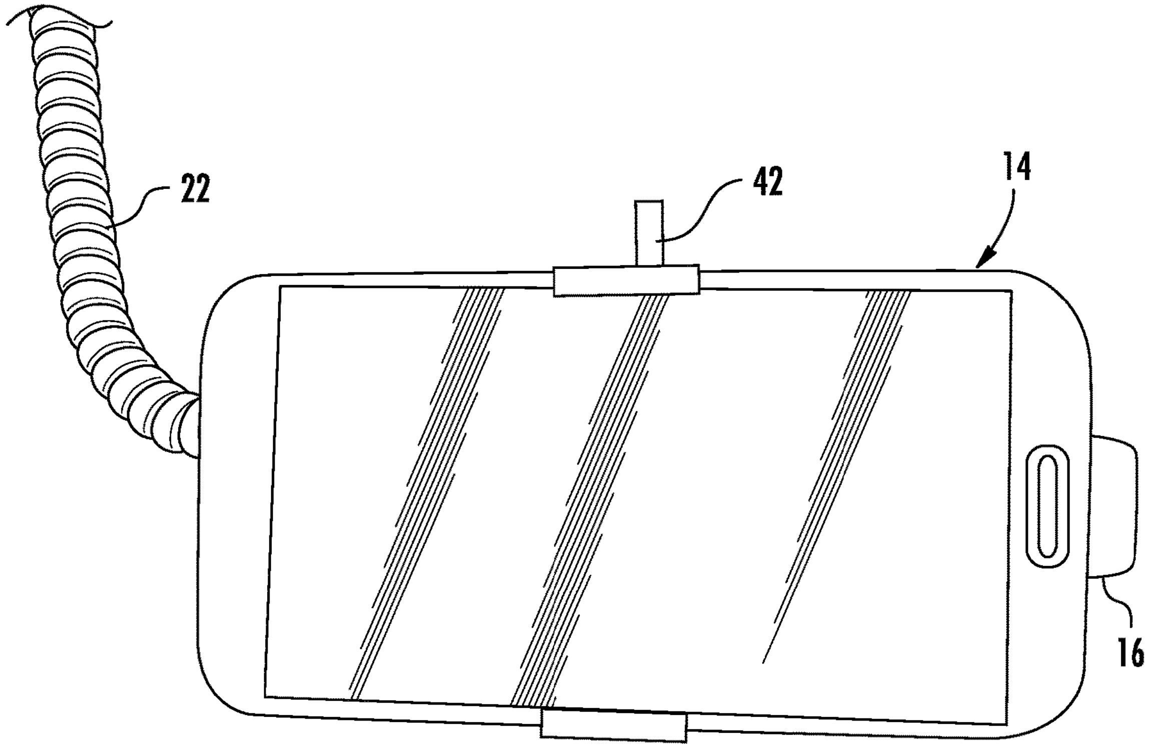
FIG. 10 is an opposite plan view of the item of merchandise shown in FIG. 9.

FIGS. 9-10 illustrate that in some embodiments, the sensor 12 may include one or more bracket arms 42. The bracket arms 42 may be used to prevent or resist removal of the sensor 12 from the item of merchandise 14. Where the sensor 12 and clip 20 attach to one another in a rotational connection, the bracket arms 42 may resist such rotational movement so that the sensor may be not be easily removed from the clip. The bracket arms 42 may be secured using one or more fasteners and a proprietary tool. Thus, the bracket arms 42 may reduce the incidence where an unauthorized person removes the sensor 12 and before the sensor can determine a location and communicate the location to the monitoring system 25. It is likely that an unauthorized person will remove the sensor 12 following a delay after the security event occurs, and during this delay, the sensor may be able to determine its location for tracking the item of merchandise 14.

In one embodiment, the flexible circuit 34 may include a sensing mechanism for detecting removal of the battery cover or door. Thus, where the sensing mechanism detects removal of the cover or door, the sensor 12 may then determine the location thereof. Such a sensing mechanism could be any suitable mechanism such as an optical sensor, a switch, or the like. Therefore, in addition to or as an alternative to activating location tracking in response to motion of the sensor, the sensor may determine a location when a sensing mechanism is activated.

In some embodiments, the item of merchandise 14 may not include a removable battery cover or door. Thus, the flexible circuit 34 may not be able to be used in all circumstances. In this instance, the connector 16 and cable 23 may cooperate with the item of merchandise 14 to receive power from the item's internal power source. For instance as discussed above, the sensor 12 may utilize USB "on-the-go" or like functionality for facilitating power transfer from the item of merchandise 14 to the sensor 12. In some cases, the sensor 12 and the item of merchandise 14 may be configured to communicate with one another to facilitate power transfer therebetween. For example, the item of merchandise 14 may be configured to recognize a particular connector type which allows for power to be provided from the item to the sensor 12.

In another embodiment, the sensor 12 may be configured to detect when power being provided via the alarm module 18 has ceased. For example, power may cease when the cable 22 has been cut. However, power may also cease when the alarm module 18 is disarmed within an authorized key. Thus, the sensor 12 may also be configured to listen for an audible alarm generated by the alarm module 18. Where the power ceases and an alarm is generated, the sensor 12 may determine that a security event has occurred and therefore begin determining the location of the sensor for communicating to the monitoring system 25. Thus, only when at least two conditions have been met (e.g., power loss and security signal generation) will the sensor 12 determine its location or otherwise communicate with the monitoring system 25. Alternatively, the sensor 12 may initiate location tracking when motion is detected and a security signal is detected.

In further embodiments, the alarm module 18 may be configured to communicate with the monitoring system 25 directly. For example, the alarm module 18 may be configured to communicate with the monitoring system 25 in response to a security event.

In one embodiment, the item of merchandise 14 includes wireless communications circuitry. The item of merchandise 14 may also include a controller operably coupled to the wireless communications circuitry, a global positioning system (GPS), an accelerometer, an orientation sensor, a microphone, a camera, and/or an output device. The controller may be configured to cooperate with the wireless communications circuitry to coordinate and control operations of the item of merchandise 14, namely wireless communications functions and capabilities thereof. Operations may include mobile voice and data operations, including email and Internet data, for example.

In some embodiments, the monitoring system 25 may be configured to communicate with the item of merchandise 14 and/or sensor 12 to perform one or more functions or to request data from the item of merchandise. For instance, following a security event, the monitoring system 25 may communicate with the sensor 12 to send a command to the item of merchandise 14, such as to take a photograph or record sound. The data acquired by the item of merchandise 14 may then be communicated back to the monitoring system 25 via the item of merchandise or the sensor. The sensor 12 may be configured to request data from the item of merchandise 14 and communicate the same to the monitoring system 25.

FIGS. 13-17 illustrate another embodiment of the present invention, which may be useful where the item of merchandise 14 does not provide for a removable battery cover or door as discussed above. In this embodiment, the security system 50 includes a cable 52 with a connector 16 configured to connect to the item of merchandise 14. As noted above, the cable 52 may be a flexible or rigid component that is configured to engage an input port of the item of merchandise. The cable 52 may be of a low profile that is configured to be positioned adjacent to the rear surface of the item of merchandise 14. As shown, the cable 52 is integrated with a clip 54, although the cable and clip could be attached to one another. The clip 54 is configured to be attached to the item of merchandise 14 using any desired technique as discussed above, while the cable 52 and clip are configured to facilitate an electrical connection between the item of merchandise and the sensor 56. In this example, the sensor 56 is configured to slidably engage the clip 54 in a releasable engagement. To facilitate such engagement, the clip 54 and/or sensor 56 may include one or more engagement features 55 (e.g., slots and rails) for sliding engagement with another. The clip 54 and/or sensor 56 may include one or more slots 62, 64, respectively, for receiving one or more bracket arms 42 for securing the sensor 12 to the item of merchandise 14 as discussed above.

To facilitate the electrical connection between the item of merchandise 14 and the sensor 12, the clip 54 may include one or more conductors 58. The sensor 56 may in turn include one or more conductors 60 (e.g., electrical pogo pins) that are configured to align with and engage the conductors 58 of the clip 54. Similar to the flexible circuit 34 discussed above, the cable 52 may include one or more conductors. The conductors may extend between the connector 16 and the conductors 58. Thus, when the sensor 56 is engaged with the clip 54, the conductors 58, 60 are electrically connected, and the item of merchandise 14 is thereby electrically connected to the sensor 56.

In some embodiments, the security system is configured to utilize the functionality of the item of merchandise 14 rather than the sensor 12, 56 for tracking the item of merchandise. Thus, the size and complexity of the sensor 12, 56 may be reduced or omitted where the item of merchandise 14 can be utilized to carry out the same or similar functionality. As such, the item of merchandise 14 and the sensor 12, 56 may be integrated into a single component in some embodiments. For example, the item of merchandise 14 may include a SIM card interface, wireless communications circuitry, global positioning system (GPS), an accelerometer, an orientation sensor, a battery, and/or an output device that may be used to determine the location of the item of merchandise. Where the item of merchandise 14 does not include suitable tracking functionality, a SIM card with such functionality may be used in conjunction with the item of merchandise. In this example, the item of merchandise 14 may include software that is configured to determine its location and to communicate with a monitoring system 25 as discussed above. The item of merchandise 14 may be configured to determine its proximity or location relative to a home or display position. Moreover, the item of merchandise 14 may initiate tracking when the item of merchandise is moved from the home or display position, or at a predetermined location or distance away from the home or display position. The item of merchandise 14 may be configured to perform such tracking functionality as long as the item of merchandise is receiving power from its internal power source 36.

Moreover, the software application provided on the item of merchandise 14 could be automatically activated in response to a security event and/or various other triggering events. For example, two-way communication between the item of merchandise 14 and the alarm module 18 could be used. Or, the presence or absence of power could be used to determine a triggering event, such as where the item of merchandise 14 detects that a cable has been cut based on a loss of power. If the alarm module 18 is disarmed prior to a loss of power, the item of merchandise 14 may determine that no security event has occurred, which will minimize false alarms and allow for powering down and/or remerchandising without triggering an alarm. In another embodiment, the item of merchandise 14 and/or sensor 12, 56 and the monitoring system 25 may be configured to be paired with one another (e.g., via Bluetooth or BLE communication). Thus, where power and pairing are lost, the item of merchandise 14 may be configured to initiate tracking. In some embodiments, the item of merchandise 14 may be configured to determine its location using techniques similar to that described in U.S. Patent Publication No. 2012/0293330, entitled Systems and Methods for Protecting Retail Display Merchandise From Theft, the contents of which is incorporated by reference herein in its entirety.

It should be noted that the operations executed by the sensor, the alarm module, and/or the item of merchandise for any of the embodiments disclosed herein may be provided by a computer-readable medium, memory, or other storage medium. Many modifications and other embodiments of the invention will be readily apparent to one skilled in the art having the benefit of the teachings presented in the foregoing descriptions and the associated drawings. Therefore, it is understood and appreciated that the invention is not to be limited to the specific embodiments disclosed herein, and that modifications to the disclosed embodiments and other undisclosed embodiments are intended to be included within the scope of the appended claims.

That which is claimed is:

1. A security system for an electronic item of merchandise, the security system comprising:

a sensor configured to be electrically connected to an item of merchandise, wherein the sensor is configured to detect a security event; and a clip configured to be attached to the item of merchandise, wherein the clip comprises a connector configured to removably engage an input port of the item of merchandise, wherein the sensor is removably attachable to the clip, wherein each of the sensor and the clip comprises one or more engagement features for facilitating removable engagement with one another, wherein each of the sensor and the clip comprises one or more conductors, and wherein the conductors are configured to align with and electrically connect with one another when the sensor is attached to the clip and to electrically disconnect when the sensor is removed from the clip, and wherein the sensor is configured to be electrically connected to the item of merchandise when the connector is engaged with the input port and the sensor is attached to the clip.

2. The security system of claim 1, further comprising an alarm module configured to communicate with the sensor, wherein the alarm module is configured to be coupled to a remote power source for providing power to the sensor and the item of merchandise.

3. The security system of claim 1, wherein the sensor and the clip are configured to rotatably engage with one another.

4. The security system of claim 1, wherein the sensor and the clip are configured to slidably engage with one another.

5. The security system of claim 1, further comprising an alarm module configured to communicate with the sensor, wherein the alarm module is configured to generate a security signal in response to the security event.

6. The security system of claim 1, wherein the sensor is configured to generate a security signal in response to the security event.

7. The security system of claim 1, further comprising a cable extending between the clip and the connector.

8. The security system of claim 7, wherein the clip and the cable are integrated into a single component.

9. The security system of claim 7, wherein the cable is flexible.

10. The security system of claim 7, wherein the cable is rigid.

11. The security system of claim 1, wherein the sensor is removably attachable to the clip such that the sensor is configured to be removed from the clip while the clip remains attached to the item of merchandise and the connector remains engaged with the input port.

12. The security system of claim 1, wherein the security event comprises removing the sensor from the item of merchandise in an authorized manner.

13. The security system of claim 1, wherein the clip or the sensor is configured to receive one or more bracket arms for securing the sensor to the item of merchandise.

14. The security system of claim 1, further comprising an alarm module configured to communicate with the sensor, wherein the sensor is coupled to the alarm module via a cable.

15. The security system of claim 1, further comprising an adhesive for attaching the clip to the item of merchandise.

16. The security system of claim 1, further comprising a monitoring system configured to wirelessly communicate with the sensor.

17. The security system of claim 1, further comprising an alarm module configured to communicate with the sensor, wherein the alarm module is configured to removably support the sensor thereon.

18. The security system of claim 1, wherein the one or more conductors of the clip and the connector are located at opposite ends from one another on the clip and connected by a rigid component configured to be positioned adjacent to a rear surface of the item of merchandise.

19. A method for securing an item of merchandise from theft, the method comprising:

attaching a clip to an item of merchandise, wherein the clip comprises a connector configured to engage an input port of the item of merchandise; and removably attaching a sensor to the clip for electrically connecting the sensor to the clip and the item of merchandise, wherein each of the sensor and the clip comprises one or more engagement features for facilitating removable engagement with one another, wherein each of the sensor and the clip comprises one or more conductors, wherein the conductors are configured to align with and electrically connect with one another when the sensor is attached to the clip and to electrically disconnect when the sensor is removed from the clip, wherein the sensor is configured to be electrically connected to the item of merchandise when the connector is engaged with the input port and the sensor is attached to the clip, and wherein the sensor is configured to detect a security event.

20. A security system for an electronic item of merchandise, the security system comprising:

a sensor configured to be electrically connected to an item of merchandise, wherein the sensor is configured to detect a security event; and a clip configured to be attached to the item of merchandise, wherein the clip comprises a connector configured to removably engage an input port of the item of merchandise, wherein the sensor is removably attachable to the clip, wherein the clip or the sensor is configured to receive one or more bracket arms for securing the sensor to the item of merchandise, wherein each of the sensor and the clip comprises one or more conductors, and wherein the conductors are configured to align with and electrically connect with one another when the sensor is attached to the clip and to electrically disconnect when the sensor is removed from the clip, and wherein the sensor is configured to be electrically connected to the item of merchandise when the connector is engaged with the input port and the sensor is attached to the clip.

* * * * *